UNITED STATES PATENT OFFICE.

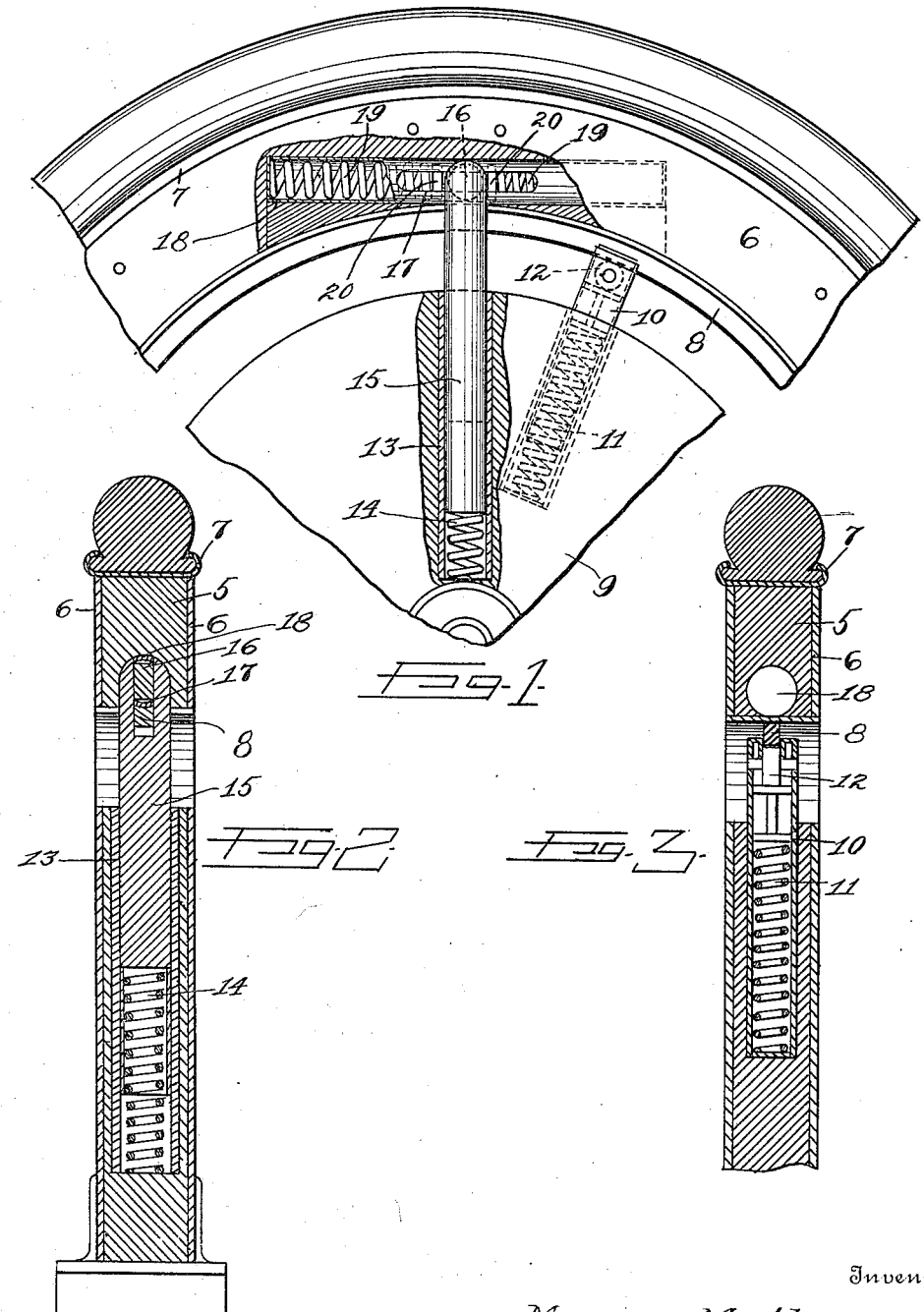

MARIUS MATHIESEN, OF SAN ANTONIO, TEXAS.

RESILIENT VEHICLE-WHEEL.

1,034,475.   Specification of Letters Patent.   Patented Aug. 6, 1912.

Application filed March 19, 1912. Serial No. 684,705.

*To all whom it may concern:*

Be it known that I, MARIUS MATHIESEN, a citizen of the United States of America, residing at San Antonio, in the county of Bexar and State of Texas, have invented certain new and useful Improvements in Resilient Vehicle-Wheels, of which the following is a specification.

This invention relates to resilient vehicle wheels, and more particularly to a spring wheel comprising inner and outer portions, together with spring plungers supporting the inner and outer portions of the wheel with relation to each other.

The wheel further comprises yieldingly supported plungers carried by the inner portion of the wheel and capable of a limited movement longitudinally of the outer portion of the wheel, said limited longitudinal movement being resisted by the action of spring buffers, as hereinafter described.

Further objects and advantages of the invention will be set forth in the detailed description which now follows.

In the accompanying drawing Figure 1 is a view partly in side elevation and partly in section of a portion of a wheel constructed in accordance with the invention. Fig. 2 is a transverse vertical section through one of the driving plungers, and Fig. 3 is a like view through one of the supporting plungers.

Like numerals designate corresponding parts in all of the figures of the drawing.

Referring to the drawing, the numeral 5 designates an annular felly portion having the plates 6 secured to its opposite sides and carrying a rim 7 of the usual and well known construction. Upon its inner periphery this felly carries an annular track 8, and the felly is supported in spaced relation to the inner portion 9 of the wheel by plungers 10, normally forced outward by springs 11, said plungers carrying rollers 12 that travel upon the track way 8. The inner portion 9 of the wheel is provided with a plurality of bearing sleeves 13, in which springs 14 are located. Driving plungers 15 bear upon these springs and said driving portions are bifurcated at their outer ends to straddle the track 8. The upper ends of the driving plungers carry pivot pins 16 which travel in guideways 17 formed in the side walls of the tube 18. Disposed in the outer end portions of the tube are springs 19 which bear against bearing blocks 20 and against which bearing blocks an enlarged portion of pivot pins 16 thrust.

It will, therefore, be seen that the present device comprises means for yieldingly supporting the inner portion of the wheel from the outer portion of the wheel for permitting a limited rolling movement of one of these portions with relation to the other to thereby permit a yielding thrust of the driving plungers 15 against the outer portions of the wheel. When wheels of this character are used as driving wheels, this results in the starting of the vehicle without the sudden jerks and jars that would be present if these parts were rigidly connected. The sudden starting of motor vehicles when the driving wheels thereof are thrown into gear with the engine is very hard on the tires and it is desirable to relieve this strain on the tires as much as possible.

From the foregoing description it will be seen that simple and efficient means are herein provided for accomplishing the objects of the invention, but while the elements shown and described, are well adapted to serve the purposes for which they are intended it is to be understood that the invention is not limited to the precise construction set forth, but includes within its purview such changes as may be made within the scope of the appended claims.

Having described my invention, what I claim is—

1. In a device of the character described, the combination with an inner portion, an annular felly portion surrounding the inner portion and spaced therefrom, a tube disposed longitudinally in said felly portion and having its side walls cut away to form guideways, a pivot pin traveling in said guideways, springs located in said tube, bearing blocks against which said springs bear, said bearing blocks in turn bearing against said pivot pin, a driving plunger engaging with said pivot pin, said driving plunger being slidably disposed in the inner portion of the wheel, a spring normally tending to force said plunger outwardly, an annular trackway carried by the felly portion, an additional spring pressed plunger carried by the inner portion of the wheel and a roller carried by said spring pressed plunger which has rolling engagement with said trackway.

2. In a device of the character described, the combination with an inner portion, of an annular felly portion surrounding the inner portion and spaced therefrom, a tube disposed longitudinally in said felly portion and having its side walls cut away to form guideways, a pivot pin traveling in said guideways, springs located in said tube one upon each side of said pivot pin and bearing thereagainst, a driving plunger engaged with said pivot pin, said driving plunger being slidably and radially disposed in the inner portion of the wheel, a spring normally tending to force said plunger outwardly, an annular trackway carried by the felly portion, an additional spring pressed plunger carried by the inner portion of the wheel, a roller carried by the last named plunger which has rolling engagement with said trackway, said plunger having a bifurcated outer end which straddles said trackway to thereby prevent lateral displacement of the said plunger with relation to the trackway.

In testimony whereof I affix my signature in presence of two witnesses.

MARIUS MATHIESEN.

Witnesses:
C. W. BUHLER,
R. J. DOYLE.

Copies of this patent may be obtained for five cents each, by addressing the "Commissioner of Patents, Washington, D. C."